(12) United States Patent
Tabell

(10) Patent No.: US 8,274,175 B2
(45) Date of Patent: Sep. 25, 2012

(54) METHOD AND ARRANGEMENT IN CONJUNCTION WITH EMERGENCY LIGHT

(75) Inventor: Jari Tabell, Lahti (FI)

(73) Assignee: Teknoware Oy, Lahti (FI)

( * ) Notice: Subject to any disclaimer, the term of this patent is extended or adjusted under 35 U.S.C. 154(b) by 17 days.

(21) Appl. No.: 12/475,014

(22) Filed: May 29, 2009

(65) Prior Publication Data

US 2010/0001584 A1  Jan. 7, 2010

(30) Foreign Application Priority Data

May 29, 2008 (FI) .................................... 20085515

(51) Int. Cl.
*H02J 1/10* (2006.01)
*H02J 3/38* (2006.01)
*H02J 9/00* (2006.01)

(52) U.S. Cl. ........................... 307/23; 320/166; 320/167
(58) Field of Classification Search ...................... 307/23
See application file for complete search history.

(56) References Cited

U.S. PATENT DOCUMENTS

| | | | | |
|---|---|---|---|---|
| 5,012,121 A | * | 4/1991 | Hammond et al. | 307/64 |
| 5,818,125 A | * | 10/1998 | Manchester | 307/66 |
| 6,075,378 A | | 6/2000 | Okamura | |
| 6,642,632 B2 | * | 11/2003 | Lucas et al. | 307/64 |
| 6,666,123 B1 | * | 12/2003 | Adams et al. | 89/6.5 |
| 7,323,849 B1 | * | 1/2008 | Robinett et al. | 320/167 |
| 7,692,334 B2 | * | 4/2010 | Kohler et al. | 307/71 |
| 2002/0044917 A1 | * | 4/2002 | De La Poterie et al. | 424/70.11 |
| 2002/0049917 A1 | * | 4/2002 | Portman et al. | 713/300 |
| 2005/0138311 A1 | * | 6/2005 | Ko | 711/162 |
| 2006/0044801 A1 | | 3/2006 | Schweigert | |
| 2006/0108875 A1 | * | 5/2006 | Grundmann et al. | 307/70 |
| 2006/0267409 A1 | * | 11/2006 | Mullet et al. | 307/64 |
| 2008/0191628 A1 | * | 8/2008 | Marques et al. | 315/86 |
| 2010/0013308 A1 | * | 1/2010 | Lathrop et al. | 307/64 |

FOREIGN PATENT DOCUMENTS

| | | | |
|---|---|---|---|
| FI | 19991856 A | | 3/2001 |
| GB | 2140991 | * | 12/1984 |
| JP | 04190624 A | | 7/1992 |
| JP | 10129406 A | | 5/1998 |
| JP | 2007-128667 A | | 5/2007 |
| JP | 2007128667 | * | 5/2007 |
| WO | WO 2004/082097 A1 | | 9/2004 |

OTHER PUBLICATIONS

WO Pub 2006/081613 to Mars et al., Aug. 10, 2006.*

* cited by examiner

*Primary Examiner* — Rexford Barnie
*Assistant Examiner* — Justen Fauth
(74) *Attorney, Agent, or Firm* — Leydig, Voit & Mayer, Ltd.

(57) ABSTRACT

A method in conjunction with an emergency light, and an emergency light with equipment comprising one or more LED light sources (52) for producing emergency lighting; a super capacitor (C1) arranged to supply one or more LED light sources (52), a charging apparatus (A) arranged to charge the super capacitor (C1) to a predetermined nominal voltage. The equipment of the emergency light further comprises means for deviating the charging voltage (U) produced by the charging apparatus; and means (C) for detecting the capacitor circuit voltage when the charging voltage is being deviated, the means (C) being arranged to detect a defect in the capacitor circuit in response to the voltage detection.

2 Claims, 4 Drawing Sheets

METHOD AND ARRANGEMENT IN CONJUNCTION WITH EMERGENCY LIGHT

BACKGROUND OF THE INVENTION

The invention relates to emergency lights and particularly to using emergency lights together with a super capacitor.

According to law, public buildings must have emergency lighting in the event of a power failure. These systems are defined by standards EN 1838 and EN 50172. In practice, the systems are provided with a battery back-up. Other types of standby electric sources are also used, e.g. hospitals may have a standby electric supply powered by a combustion engine.

Standby lights are most commonly implemented by fluorescent lamps, because they provide a good relationship between service life and luminous efficiency. A problem with fluorescent lamps is the mercury used in them. Today door lights in particular are already realized mainly with LEDs.

Batteries used in emergency lights have also developed greatly. Lead acid batteries and NiCd batteries also contain environmentally hazardous substances. One significant way of storing energy is a capacitor. Today capacitors are almost the only reserve energy sources used for buffer memories in information technology. As a result, the capacitor industry has started to develop 'super capacitors'. Super capacitors employ double-layer technology and are low-voltage high-capacitance capacitors.

By modern technology it is thus possible to eliminate poisonous substances from standby lights entirely. This can be realized by joining a LED light source and the advantages of a super capacitor.

Super capacitors provide advantages, which make them very attractive for use in emergency lighting. The service life of a capacitor is approximately ten years, which is about twice as much as that of presently used batteries. Capacitors may also be charged up to a desired voltage in a few minutes, which is only a fraction of the time needed for charging batteries.

Correspondingly, LED light sources are very well suited for emergency lights. While in operation, LEDs consume a very small amount of power, wherefore it is sensible to use them in conjunction with capacitors.

Publication US2006/0044801 discloses a principle of using LEDs together with a capacitor. The solution presented in the publication provides a very short-term emergency lighting, because in the circuit presented in the publication the voltage of the capacitor drops quickly.

The voltage of super capacitors is not comparable to the cell voltage of batteries, but a super capacitor may in principle be charged to an arbitrary voltage. However, super capacitors do have a voltage to which it is recommendable to charge them, and voltages higher than the recommended voltage reduce the service life of the capacitor significantly.

Super capacitors must thus be charged carefully especially in conjunction with emergency lights or similar lights subject to official requirements to ensure that the service life of the super capacitor is as long as possible and that the charging of the capacitor is reliable, and hence to allow the emergency light to be used when the normal supply network is down.

If the capacitor is charged in a voltage-controlled manner, which means that the charging apparatus charges the capacitor to a predetermined voltage, it is difficult to check the condition of the connection between the charging apparatus and the capacitor. When the capacitor charged to the desired voltage is detached from the charging apparatus, there occurs no change in the charging current or the output voltage of the charging apparatus. Consequently, damages in the circuitry between the charging apparatus and the capacitor cannot be detected. European standard EN60598-2-22, for example, requires charging circuit indication to be provided. Regular NiCd batteries may be charged using constant current, whereby the performance of the battery circuit may be deduced directly on the basis of the charging current.

BRIEF DESCRIPTION OF THE INVENTION

It is thus an object of the invention to provide emergency light equipment and a method that allow the above-mentioned problems to be solved. The object of the invention is achieved by a method and equipment, which are characterized by what is stated in the independent claims. The preferred embodiments of the invention are disclosed in the dependent claims.

The invention is based on deviating the charging voltage of a super capacitor acting as an energy reserve for emergency light equipment and observing the behaviour of voltage obtained from the capacitor circuit during this deviation. This allows the condition of the connection between the charging apparatus and that of the capacitor to be detected on the basis of changes in the capacitor circuit voltage.

An advantage of the method and system of the invention is improved reliability in super capacitor charging, particularly as regards the performance of the charging connection.

BRIEF DESCRIPTION OF THE DRAWINGS

In the following the invention will be disclosed with reference to preferred embodiments and the accompanying drawings, in which.

DETAILED DISCLOSURE OF THE INVENTION

Figure 1:
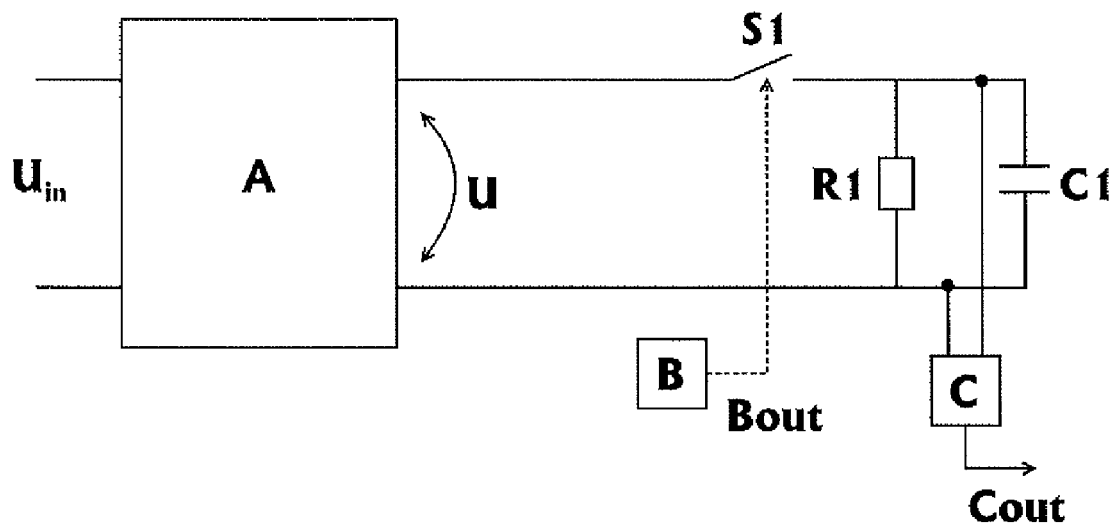
FIG. 1 shows a simplified structure of an embodiment of the invention.

FIG. 1 is a schematic block diagram of emergency light equipment according to an embodiment of the invention. The emergency light comprises a charging apparatus A, such as a chopper, which produces a charging current I from an input voltage $U_{in}$ supplied to the chopper. The input voltage may be a mains voltage or a direct voltage. The charging current I charges a super capacitor C1 acting as an energy reserve so that the super capacitor achieves its nominal voltage, which is in the order of about 4V, for example.

In parallel with the super capacitor C1 being charged according to the embodiment of FIG. 1 there is connected a resistor R1 and to the charging current path a switch S1. The switch S1 may be of a semiconductor type or a relay, for example. The switch S1 is controlled by a control circuit B so that the switch S1 momentarily switches off the charging voltage U of the super capacitor C1.

Figure 2A:
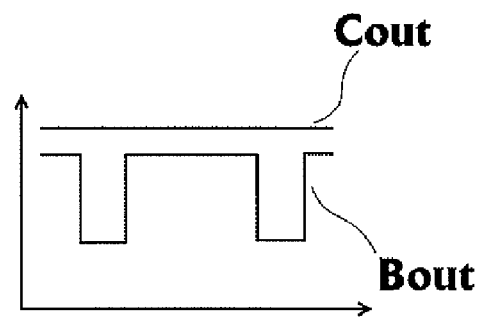
FIGS. 2a and 2b show signals of the embodiment of FIG. 1.
Figure 2B:
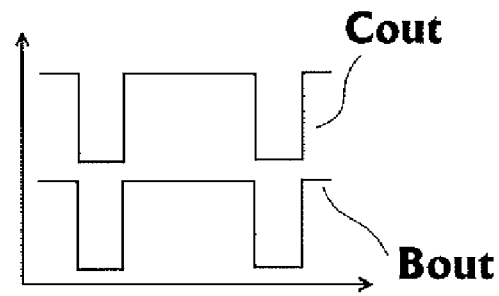

The emergency light of the invention further comprises a voltage determining member C, which in the embodiment of FIG. 1 is connected to determine the voltage of the capacitor C1. FIGS. 2a and 2b show the voltage determined by the voltage determining member when the capacitor and the charging circuit are in good condition (FIG. 2a) and when they are defective (FIG. 2b).

FIG. 2a shows how an output signal Cout of the voltage determining member C remains substantially unchanged despite the control provided by the switch S1. The switch S1 is controlled under a predetermined timing according to a signal Bout. The control Bout of the switch S1 is also shown in FIGS. 2a and 2b. The higher level of the signal Bout corresponds to a conductive state of the switch S1 and the lower level, correspondingly, to a blocking, or open, state of the switch. That the signal Cout remains on the same level irrespective of the switch control indicates a good condition of the super capacitor and its charging circuit, because the voltage of the super capacitor C1 does not change although the charging voltage is removed.

FIG. 2b shows signals corresponding to FIG. 2a in a situation where the capacitor or its circuitry is defective. In that case a clear voltage drop in the signal Cout is detected when the switch S1 is opened in response to the control signal Bout. When the switch S1 is in a conductive state, the voltage determining member C measures the capacitor voltage only apparently. In reality the voltage to be measured is the charging voltage U. When the charging voltage is disconnected from the measurement by the switch S1, the real capacitor voltage is detected. In other words, when a change is detected in the voltage to be measured upon the opening of the switch, it is possible to conclude that the capacitor or its charging circuit is defective.

The voltage determining member of FIG. 1 may be any connection or circuit which is capable of determining a voltage difference or a change thereof and which produces either the signals shown in FIG. 2a or those in 2b to its output. Alternatively, the voltage determining member may handle the signals internally and then supply information indicating defective and/or normal operation to its output.

Figure 6:
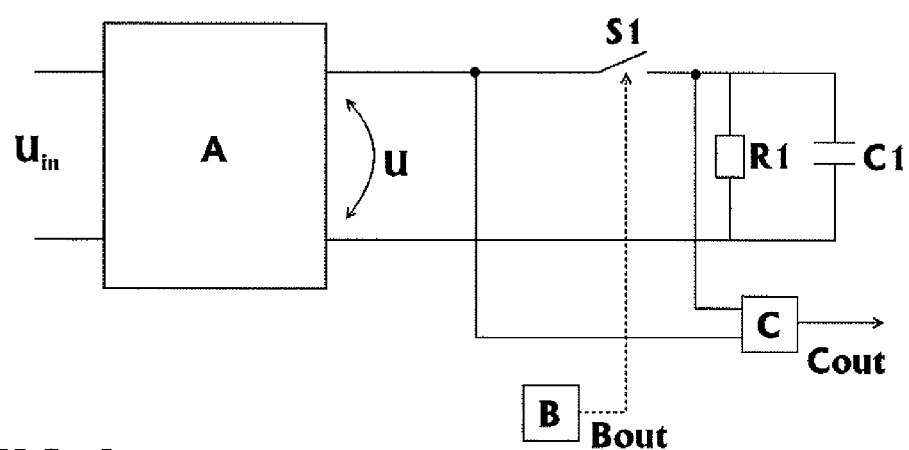
FIGS. 6 and 7 illustrate the structures of some embodiments of the invention.

The embodiment of FIG. 1 may be further modified by connecting the voltage determining member to determine the operating condition of the super capacitor and its connection on the basis of the voltage across the switch S1, as shown in FIG. 6. According to this embodiment, when the switch S1 is in a conductive state, the voltage across the switch corresponds to a voltage loss of the switch in a conductive state. When the switch is opened, with the super capacitor and the circuits connected thereto in good condition, the voltage across the switch remains low and the super capacitor maintains its charge. A defective super capacitor, in turn, is detected when the voltage determining member detects a change in the voltage measured across the switch S1.

Figure 3:
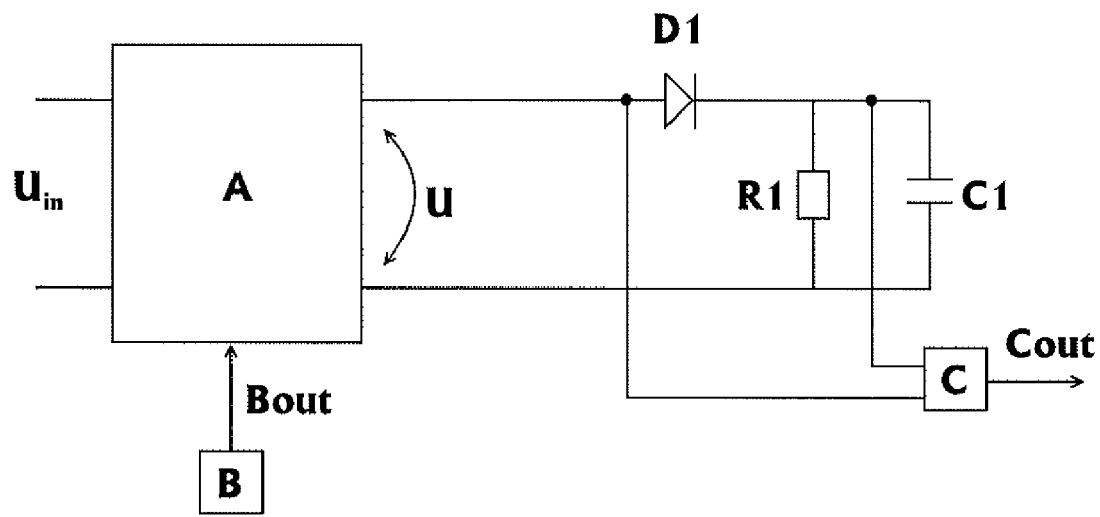
FIG. 3 shows a simplified structure of a second embodiment of the invention.

FIG. 3 shows a second preferred embodiment of the invention. In this embodiment there is a resistor R1 connected in parallel with the super capacitor C1, and on the current path between the capacitor C1 and the charging apparatus A arranged to charge it, there is connected a diode D1. The diode D1 is connected so that charging current may flow through the diode, i.e. the anode of the diode is connected to the charging apparatus A and the cathode to the capacitor C1 to be charged. A voltage detector C is connected to determine the voltage across the diode.

According to the embodiment of FIG. 3 the charging apparatus is controlled to momentarily decrease its output voltage. This output voltage drop is presented as controlled by the control block B, which supplies a control signal Bout to the charging apparatus A. When the capacitor C1 is charged with a charging voltage suitable for the situation, the diode is in a conductive state and the measurement result of the voltage detector shows a voltage difference equal to the threshold voltage of the diode.

The voltage of the charging apparatus A is momentarily dropped in response to the signal Bout. When the capacitor C1 and its circuitry are in good condition, the capacitor maintains its charge. In other words, the voltage of the capacitor C1 is higher than the charging apparatus voltage and hence the diode D1 enters a blocking state, whereby the value of the voltage across the diode changes at the same time.

When the charging voltage is momentarily dropped and if the capacitor or its wiring is defective, the capacitor voltage drops in proportion to the drop in the input voltage. The diode D1 remains in the conductive state and the voltage measured across the diode remains unchanged despite the change in the charging voltage.

Figure 4A:
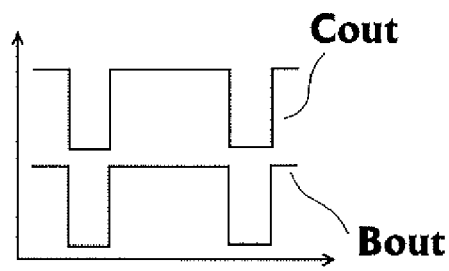
FIGS. 4a and 4b show signals of the embodiment of FIG. 3.
Figure 4B:
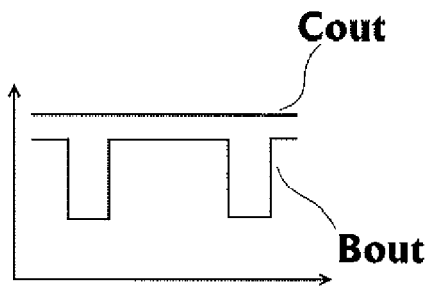

The measurement signal Cout and the control signal Bout of the embodiment of FIG. 3 are shown in FIGS. 4a and 4b. FIG. 4a shows the measurement signal Cout from the block C and the control signal Bout from the block B when the capacitor is in good condition. Correspondingly, FIG. 4b shows the same signals when the capacitor is defective.

The voltage detector of FIG. 3 may be of a simple comparator coupling type, because the voltage of the diode D1 changes its polarity in accordance with the control signal Bout when the capacitor C1 is in good condition. The structure of FIG. 3 is shown in the form of separate operating blocks. However, it is obvious that the functions of block B, for example, may be integrated directly into the charging apparatus.

Figure 7:
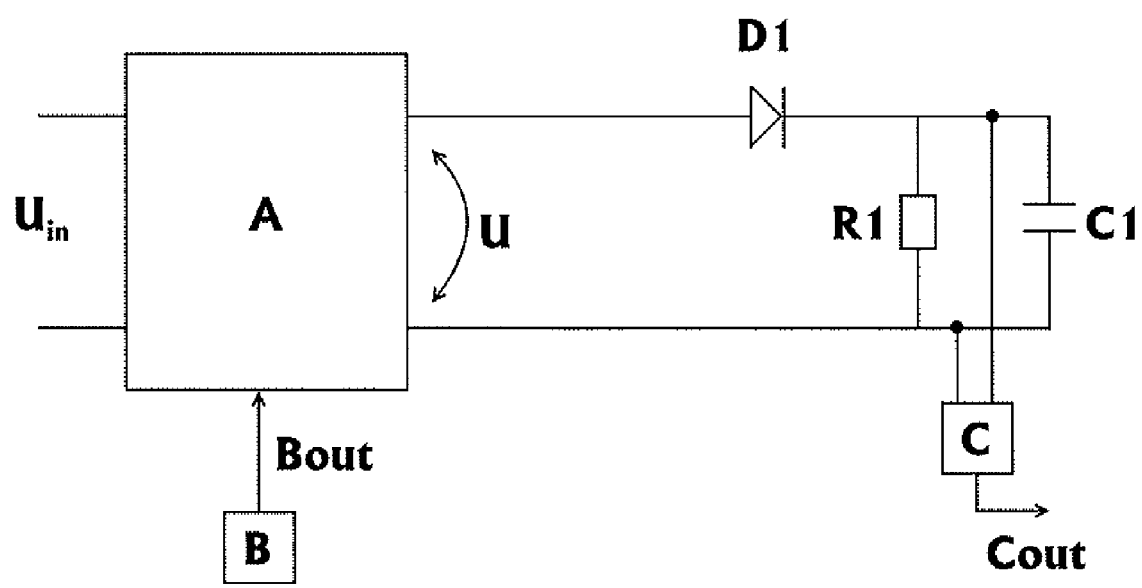

In the example of FIG. 3 voltage detection may be implemented also by using a similar coupling as in FIG. 1, as shown in FIG. 7. By determining the voltage of the super capacitor C1 it is possible to conclude whether the capacitor charge remains when the charging voltage is decreased, because the diode D1 prevents current from flowing from the capacitor C1 to the charging apparatus. In this embodiment of the invention a fault in the capacitor or the capacitor circuit is detected when the measurement signal Cout changes in accordance with the control signal Bout.

The structure of the invention also enables evaluation of the capacitance of the super capacitor, because when supply to the capacitor is switched off, the capacitor begins to discharge through the resistor R1. As a result, an RC circuit is formed, the time constant of the circuit depending on the known resistance of the resistor and on the capacitance of the capacitor. By measuring the rate at which the voltage decreases it is thus possible to make a precise estimate of the magnitude of the capacitances of the capacitor. It is to be noted that the curves representing capacitor voltage in the Figures are rectangular pulses illustrating the operation of the invention and not pulses undergoing real changes.

FIGS. 1 and 3 only show the charging apparatus A of the emergency light and the chargeable super capacitor C1, and parts belonging to the invention to indicate a fault in the capacitor C1. However, it is obvious that the emergency light contains other parts as well. These are shown in FIG. 5 without the parts needed for indication a fault.

Figure 5:
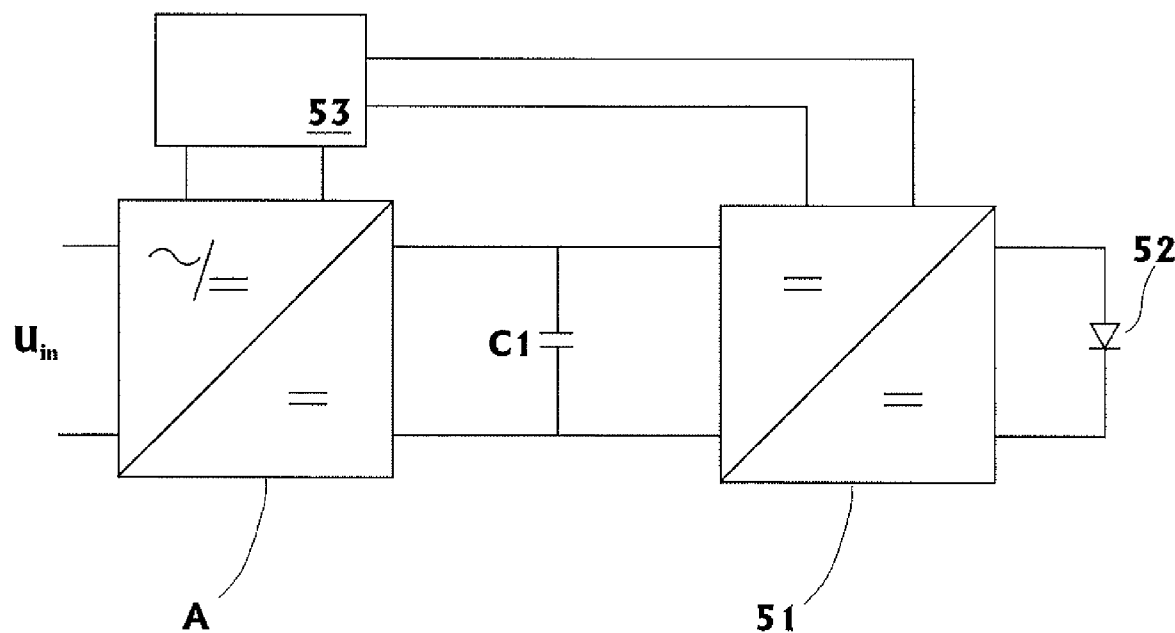
FIG. 5 illustrates an example of an emergency light structure.

As shown in FIG. 5, the super capacitor C1 is further connected to the chopper 51, which typically produces constant current for a light diode. The chopper 51 is therefore of a type capable of both increasing and decreasing a voltage, because the nominal voltage of the super capacitor C1 may be greater than the nominal voltage of the light diode to be used. However, the super capacitor charge drops fairly quickly, which is why the voltage must be increased in order to burn the light diode.

In FIG. 5 the chopper 51 supplying a LED 52 is shown with two inputs. Normally, when the supply network or some other voltage is available, the chopper 51 is supplied with a device 53 that produces a voltage suitable for the chopper 51 from the voltage of the supply network or the like. In the example of FIG. 5 the charging apparatus A is connected to the device 53 in order to supply it, the device 53 being a converter, for example, producing a constant voltage for the chopper 51. In this type of arrangement the device 53 may further contain means for connecting the voltage of the charging apparatus A directly to the LED 52. It is obvious that there are various ways of changing over from the normal network to energy charged in the super capacitor. The supply changeover may be carried out by using different connections, change-over switches, relays or the like, and the present invention does not differ from the previous emergency light connections.

The super capacitor C1 is supplied in a current-controlled manner, i.e. the capacitor is charged by supplying a current of a predefined magnitude from the charging apparatus A to the super capacitor in order to charge it. To provide the set value for current, the charging apparatus must adjust its output voltage so that the output voltage increases as the voltage of the chargeable capacitor increases in order to supply current. When the voltage reaches the predetermined value, the current is switched off.

According to a preferred embodiment of the invention, the chopper 51 is operated in a current-controlled manner, which means it supplies the LED light source with a current of a specific magnitude. The chopper is thus controlled to adjust its output voltage so as to produce a desired current for the LED light source.

When the network is in operation and the emergency light is used as a guide light, the LED may be burnt with a brighter light than during a power failure. It is thus easier to detect the light when the luminosity of the surroundings is higher. During a power failure the LED is easier to distinguish and may therefore be burnt with a dimmer light, which also further extends the service life of the emergency light.

The invention has been described above with reference to one LED light source only. However, it is obvious that a plurality of LEDs may be provided. Correspondingly, a plurality of super capacitors may be connected in parallel and/or in series.

It is obvious to a person skilled in the art that as technology advances the basic idea of the invention may be implemented in various ways. The invention and its embodiments are thus not restricted to the above examples but may vary within the scope of the claims.

The invention claimed is:
1. An emergency light with equipment comprising
at least one LED light source for producing emergency lighting;
at least one super capacitor arranged to supply the at least one LED light source,
a charging apparatus arranged to charge the super capacitor to a predetermined nominal voltage,
means for deviating the charging voltage produced by the charging apparatus including a control circuit arranged to control the charging apparatus to drop the voltage produced by the charging apparatus in accordance with the control signal of the control circuit; and
means for detecting the capacitor circuit voltage when the charging voltage is being deviated, the means for detecting being arranged to indicate a defect in the capacitor circuit in response to the voltage detection, the means for detecting including a resistor connected in parallel with the capacitor and a diode connected to the charging current path of the capacitor, and a voltage detector determining the voltage across the diode, the voltage detector being arranged to detect a defect in the capacitor circuit when the output of the voltage detector remains substantially unchanged despite the control of the control circuit.
2. An emergency light with equipment comprising:
emergency light
at least one LED light source for producing emergency lighting;
at least one super capacitor arranged to supply the at least one LED light source,
a charging apparatus arranged to charge the super capacitor to a predetermined nominal voltage,
means for deviating the charging voltage produced by the charging apparatus comprising a control circuit arranged to control the charging apparatus to drop the voltage produced by the charging apparatus in accordance with the control signal of the control circuit, and
means for detecting the capacitor circuit voltage when the charging voltage is being deviated, the means for detecting comprising a resistor connected in parallel with the capacitor and a diode connected to the charging current path of the capacitor, and a voltage detector determining the voltage across the capacitor, the voltage detector being arranged to detect a defect in the capacitor circuit when the output of the voltage detector changes in accordance with the control of the control circuit.

* * * * *